3,490,922
PROCESS FOR PREPARING LOW D.E. SYRUPS
Thomas L. Hurst, Decatur, Ill., assignor to A. E. Staley Manufacturing Company, Decatur, Ill., a corporation of Delaware
No Drawing. Filed July 14, 1966, Ser. No. 565,069
Int. Cl. C13k 1/00; A23l 1/08
U.S. Cl. 99—142                     1 Claim

---

ABSTRACT OF THE DISCLOSURE

Process for making starch conversion syrup of about 22 to 30 percent D.E. acidified starch slurry is heated uniformly by mixing with steam. The thinned starch, at a D.E. of about 13 to 16 percent, is cooled and converted with alpha amylase to the desired D.E. The syrup is stable to haze formation.

---

This invention relates to the production of syrups of low dextrose equivalent (D.E.) by the action of a diastatic enzyme on starch acid-hydrolyzates. More particularly, it relates to a method of making syrups of this type which are essentially starch free and which, in reference to haze development, are stable in storage.

Starch conversion syrups having a D.E. of from about 26 to about 40 percent are widely used in the food industry. For example, they are used in large quantities in the manufacture of ice cream. In this application they are effective to prevent "heat shock," the formation of ice crystals resulting from the partial thawing of the ice cream followed by refreezing. The solids obtained from these syrups are excellent dispersing agents for the fats and oils in coffee whiteners. In hard candy manufacture, these syrups are useful bodying agents which impart no hygroscopicity to the product. However, such syrups, when produced in conventional manner, tend to haze on standing and this fact limits their usefulness.

Broadly speaking the production of syrups of the type described involves the treatment of a starch acid-hydrolyzate having a D.E. within a desired low range with an enzyme such as alpha-amylase to effect further hydrolysis. This further hydrolysis is carried out in a manner such that no marked increase in the D.E. of the hydrolysis product results. Typically, an aqueous slurry containing an acid hydrolysis catalyst, preferably hydrochloric acid, is heated to paste the starch. The resulting acid-thinned starch paste is charged to a pressure vessel fitted with a bottom-located sparger for the introduction of steam. Steam is admitted until the charge is heated to about 200° F. The pressure vessel is then closed and the introduction of steam under pressure continued until the starch paste has attained the desired temperature which is generally from about 270 to about 290° F. Steam flow is stopped and the contents of the vessel, under pressure, are held at temperature for a period of from about 4 to about 8 minutes. Finally, the contents are discharged to atmospheric pressure and collected, the steam under pressure over the hydrolyzate being ordinarily employed to force the contents from the vessel. As the starch hydrolyzate is discharged to atmospheric pressure a part of the water content thereof flashes off and the temperature of the hydrolyzate drops substantially instantaneously to a temperature not much in excess of the atmospheric boiling point of water.

The pH value of this hydrolyzate, which exhibits a D.E. of about 16 to 24 percent, is adjusted to a value of from 4.5 to 5.0. The hydrolyzate is then filtered and cooled to a temperature below 180° F. An alpha-amylase type enzyme is added and conversion is carried out between about 150 and about 180° F. When the D.E. of the hydrolyzate has reached a value of from about 26 to about 40 percent, the enzyme is inactivated, the hydrolyzate is decolorized, filtered and concentrated to a syrup in conventional manner.

The syrups produced as above described may be clear and essentially colorless. Nevertheless, at least slight haziness ordinarily develops within a relatively short time. As is expected, these unstable syrups, because of their dextrin content, give a color reaction with iodine.

It has heretofore been proposed to overcome the haze formation of syrups produced as above described by high temperature heat treatment and filtration at high concentration and at an elevated temperature. While these added steps may be effective to provide a storage-stable syrup, the heat treatment leads to color formation so that the product, while clear, is distinctly amber colored. For many uses a colorless syrup is demanded and this method of stabilizing the syrups cannot be employed.

It is therefore the principal object of the present invention to provide a method of producing a starch conversion syrup of low dextrose equivalent which, in regard to maintaining its initial clarity, is stable in storage. It is an additional object to provide a method of producing a syrup of this type which exhibits a dextrose equivalent of from about 22 to about 30. More specifically, it is an object of the invention to provide a method of dual hydrolysis of starch whereby an essentially colorless, storage-stable tarch conversion syrup having a dextrose equivalent in the range of from about 22 to about 30 is obtained.

It has been found that the above objects can be attained and a colorless, storage-stable syrup having the desired low D.E. can be prepared in a dual starch hydrolysis process by careful control of the heating step in the acid hydrolysis portion of the process. More specifically, it has been determined that a syrup of the type described results if each increment of the starch employed is subjected to essentially the same degree of acid hydrolysis.

It will be understood that in the above described typical dual hydrolysis process, the starch is not subjected to uniform acid hydrolysis. Several factors contribute to this, but the principal factor is the relatively long time required to discharge the hydrolyzate from the pressure vessel.

The discharge of the contents of a pressure vessel of practical size, for example one containing a charge of 3,000 gallons, requires several minutes for completion. Discharge time may thus equal or exceed the time during which the contents of the pressure vessel are held at the temperature attained by the introduction of steam. In any event, the two periods of time are of the same order of magnitude. It is therefore apparent that all portions of the starch have not been subjected to acid hydrolysis to the same extent. That first discharged has been at hydrolysis temperature only for the period that the contents of the pressure vessel where held at the temperature attained by the introduction of steam. Subsequently discharged portions have been subjected to hydrolysis conditions for longer periods. Furthermore, the temperature of the contents of the pressure vessel may drop continuously during discharge as the pressure within the vessel is lowered by the discharge of the hydrolyzate, no additional steam being admitted during discharge. It is possible that the last portion discharged will be at a temperaure only slightly greater than 212° F. Accordingly, not only are the various portions subjected to hydrolysis conditions for different periods, but the changing temperature effects continuous changes in these conditions. On the other hand, if the pressure in the vessel is maintained by admission of steam during the discharge operation, this last portion will have been at the attained temperature for the full discharge time in addition to the time required for the hydrolysis of the whole charge.

As hereinbefore indicated, the effectiveness of the method of the present invention appears to result from the fact that all of the starch is subjected to the acid hydrolysis to the same extent. This is achieved by the method of providing a stream of acidified starch slurry, continuously and uniformly heating the stream to the temperature desired for hydrolysis, maintaining the stream at approximately this temperature for a period of time necessary to effect the desired degree of hydrolysis and finally continuously and uniformly cooling the stream of starch hydrolyzate to a temperature at which no substantial further hydrolysis takes place.

If desired, the acidified starch slurry may be first heated to paste the starch and the resulting acid-thinned dispersion may be employed as the feed material to be thus continuously hydrolyzed. The temperature to which the slurry is thus heated will, of course, be below the temperature at which significant hydrolysis occurs, having regard for the concentration of the acid in the slurry. Accordingly, as employed herein and in the appended claims, the term dispersion is intended to define either an aqueous composition of pasted starch or an acidified starch slurry or suspension.

The heating of the stream to the desired hydrolysis temperature may be gradual or it may be effected rapidly. Similarly, the cooling of the stream of starch hydrolyzate may be effected gradually or substantially instantaneously. It is only necessary that all portions of the stream of hydrolyzate pass through identical temperature gradients at the same rate. However, as a practical matter, it is preferred that both the heating step and the cooling step be carried out substantially instantaneously for the reason that the desired close control of hydrolysis is readily achieved thereby.

The necessary control of heating and cooling may easily be achieved through the use of a continuous autoclave, or heat exchanger. The acidified slurry is pumped at a constant rate, for example into a coil which is in contact with a heating medium maintained at the desired temperature of hydrolysis. The length of the coil is such that the desired residence time of the aqueous starch composition therein may be achieved by adjustment of the pumping rate.

The acidified aqueous starch slurry is brought rapidly to hydrolysis temperature on entering the heated portion of the coil and is maintained at that temperature, which is from about 280 to about 300° F. for a predetermined period of time during its flow through the coil. At the end of this period the stream of hydrolyzate flows into the coil of a second heat exchanger which is surrounded by a cooling medium. It is there rapidly and uniformly cooled to a temperature at which the rate of hydrolysis is reduced to a negligible value. From this second heat exchanger the stream of hydrolyzate flows to a receiver to be processed for use in the second or enzymatic step in the dual hydrolysis process.

The stream of hydrolyzate in the first heat exchanger is under pressure, being at a temperature considerably above the atmospheric boiling point of water. Accordingly, reduction of the temperature of the hydrolyzate to about 212° F. may be effected by discharging the stream to atmosphere. At this temperature the rate of hydrolysis is not significant.

The heating of the acidified starch slurry may alternatively be brought about by continuously mixing the slurry in known manner with steam under pressure whereby the temperature of the slurry is raised substantially instantaneously to hydrolysis temperature. The heated slurry under superatmospheric pressure is then pumped into and through an elongated tubular reactor. During its passage through the reactor the slurry is maintained at approximately the temperature it attained on being mixed with steam. The rate of flow is adjusted to give the proper residence time of the slurry in the reactor. Finally, discharge of the hydrolyzate to the atmosphere through a relief valve brings about a reduction of the hydrolyzate temperature to about the atmospheric boiling point of water and the acid hydrolysis is thereby terminated.

It is readily apparent that in either of the described continuous acid hydrolysis procedures each increment of hydrolyzate has been exposed to identical reaction conditions. That is, each increment has been heated to the same temperature at the same rate, maintained at that temperature for the same period of time and cooled at the same rate from that temperature to a temperature at which the rate of the acid hydrolysis reaction is reduced to a negligible value. The continuously produced acid hydrolyzates of the present invention have desirably low D.E. values in the range of 13 to 16 percent. Because of this fact, enzymatic hydrolysis can effect an appreciable percentage increase in D.E. value without producing a final product of undesirably high D.E. That is, a stable syrup may be prepared having a D.E. no greater than 30 if the acid hydrolysis step of a dual hydrolysis process is carried out according to the present method.

The collected acid hydrolyzate is cooled to a temperature below the inactivation temperature of alpha-amylase and the pH is adjusted to a value of from about 5.0 to about 6.5 with soda ash. A suitable alpha-amylase preparation is then added to the hydrolyzate and enzyme digestion is carried out at a temperature of from about 150 to 180° F. for a period of 16–24 hours until a filtered sample gives no purple or red color with iodine. The pH of the product is adjusted to a value in the range of about 4.8 to 5.5. The product filter during enzyme conversion is then heated to a temperature, about 200° F. at which the enzyme is inactivated. The syrup liquor is held at that temperature to insure complete inactivation, a period of 15 to 20 minutes being sufficient.

The liquor is then treated with carbon black and filtered. Treatment with additional carbon black and further filtration may be carried out if required. Finally, the decolorized liquor is concentrated by evaporation to a syrup having the desired content of solids and having a D.E. of from about 22 to about 30. It will be seen that with a D.E. value in the range of 13 to 16% being obtained in the preliminary acid hydrolysis step, and with the D.E. value being increased to from about 22 to 30 per cent in the enzyme conversion step, the increase in D.E. value resulting from the enzyme conversion step ranges from a minimum of 37.5% to a maximum of 130%. The syrup is essentially colorless and is totally free from haze. Furthermore, the syrup continues to be haze-free after several months of storage at ambient temperature.

Starch conversation syrups were prepared in conventional manner and by means of the process of the present invention.

A 22° Bé. starch slurry, acidified to a pH of 1.85 with hydrochloric acid was heated to 190° F., with agitation, and maintained at that temperature for 30 minutes. The resulting acid-thinned starch dispersion was charged to an autoclave in which it was heated to 210° F. by the introduction of steam. The autoclave was closed and the introduction of steam was continued until the temperature of the charge reached 265° F. The time required for the charge to reach this temperature was 7.5 minutes. The autoclave charge was then discharged to a flash chamber (at atmospheric pressure) during 2 minutes. The pH of the liquor thus obtained was adjusted to about 5.7 after which the liquor was filtered and cooled to about 170° F. Analysis indicated a D.E. of 16.3.

An alpha-amylase preparation, Rhozyme H–39 manufactured by Rohm & Haas Company, was added in an amount equal to 0.04 percent of the weight of the starch. The enzyme-containing liquor was maintained at 170° F. for 24 hours, after which it was heated to 200° F. for 15 minutes to inactivate the enzyme. It was then cooled to about 160° F., treated with activated carbon, filtered and concentrated under vacuum to a specific gravity of 42° Bé.; the D.E. was 38.1. The resulting syrup was clear and practically colorless. After being stored for two weeks at ambient temperature, however, the syrup developed a marked haziness.

A second run was carried out, differing from the above in that the hydrolysis was carried out in a shorter period of time to give an acid hydrolyzate having a lower D.E., 12.1, than that of the first run. The clear syrup obtained exhibited the same lack of storage stability. The D.E. was 37.1.

The reaction conditions of the acid-hydrolysis steps in the foregoing syrup preparations are summarized in Table I, below, together with D.E. values and starch content of the acid hydrolyzates and of the enzyme hydrolyzates derived therefrom. It should be noted that, despite the fact that enzymatic hydrolysis was continued beyond the time needed to give the desired value of about 30, starch is still present in the hydrolyzate.

was practically colorless. Moreover, after being stored at ambient temperature for a period of six months, its appearance was unchanged; no hazing had occurred. The D.E. of this syrup was 26.4.

Since many embodiments of this invention may be made and since many changes may be made in the embodiments described, the foregoing is to be interpreted as illustrative only. The invention is, therefore, defined in the following claim.

What is claimed is:

1. A process for preparing a starch conversion syrup that is stable to haze formation and has a D.E. value of from about 22 to about 30 comprising providing an acidified aqueous dispersion of starch, continuously and at a constant rate mixing a stream of said dispersion with steam whereby the stream under superatmospheric pressure is substantially instantaneously and uniformly heated

TABLE I

| | | Acid hydrolysis batch | | | | Enzymatic hydrolysis | | | |
| | | | | | | 8 hours | | 24 hours | |
| Run | pH | Time, min. | Temp., °F. | D.E. | Percent starch | D.E. | Percent starch | D.E. | Percent starch |
| --- | --- | --- | --- | --- | --- | --- | --- | --- | --- |
| 1 | 1.85 | 7.5 | 210–265 | 16.3 | 1.7 | ca. 29.4 | 0.03 | ca. 38.1 | 0.30 |
| 2 | 1.85 | 6.75 | 210–263 | 12.1 | 4.2 | ca. 27.7 | 0.04 | ca. 37.1 | 0.04 |

In the preparation of syrups according to the method of the present invention, acid hydrolyzates were prepared having D.E. values comparable to those of the above described batch produced acid hydrolyzates.

The pH of a starch slurry having a specific gravity of 22° Bé. was adjusted to a value of 2.0 with hydrochloric acid. A stream of this slurry was continuously mixed with steam under pressure in an apparatus such as that described in U.S. 3,067,067 to give a pasted-starch dispersion at a temperature of approximately 280° F. This material was carried, in continuous flow at a uniform rate, into and through a reactor constituting a holding zone wherein the material was maintained at a temperature of 280° F. The rate of flow was such that a residence time of each increment of the dispersion was about 10 minutes. The dispersion was continuously discharged at a uniform rate to a flash chamber open to the atmosphere where the temperature of the effluent liquor was fell substantially instantaneously to about 200° F. After adjustment of the pH of the collected liquor to about 5.7, the liquor was filtered and cooled to about 170° F. The D.E. of the material was 14.5.

The same alpha-amylase preparation employed in the above described preparations was added to the liquor in an amount equal to 0.02 percent of the weight of starch. The enzyme-containing liquor was maintained at 170° F. for 7 hours. It was then heated to 200° F. and held at that temperature for 15 minutes to inactivate the enzyme. The liquor was cooled to about 160° F. filtered and concentrated under vacuum to a specific gravity of about 42° Bé. The resulting syrup was totally free of haze and to a temperature within the range of from about 280 to about 300° F., passing the heated stream into and through a holding zone wherein the temperature of the stream is maintained at substantially the aforementioned temperature, the residence time of the said stream in the said holding zone being such that the effluent hydrolyzate therefrom has a D.E. value of from about 13 to about 16, discharging the effluent hydrolyzate stream from said holding zone to atmospheric pressure whereby the temperature of the hydrolyzate stream is uniformly reduced to about the atmospheric boiling point of water, then uniformly cooling the hydrolyzate stream to a temperature below the temperature of inactivation of alpha-amylase, treating the hydrolyzate with an enzyme preparation alpha-amylase for a time sufficient to increase the D.E. of the hydrolyzate by at least 37.5% to a value of from about 22 to about 30, deactivating the alpha amylase filtering the hydrolyzate and concentrating it to a syrup.

References Cited

UNITED STATES PATENTS

| 2,893,921 | 7/1959 | Langlois et al. | 195—31 |
| 2,965,520 | 12/1960 | Snyder et al. | 195—11 |
| 3,137,639 | 6/1964 | Hurst et al. | 195—11 |

ALVIN E. TANENHOLTZ, Primary Examiner

U.S. Cl. X.R.

99—123, 137, 138; 195—31